United States Patent [19]

Mitchell et al.

[11] Patent Number: 5,791,199
[45] Date of Patent: Aug. 11, 1998

[54] REMOTE THROTTLE CONTROL

[75] Inventors: Al Mitchell, Medina; Curt D. Croley, Akron, both of Ohio

[73] Assignee: MTD Products Inc., Cleveland, Ohio

[21] Appl. No.: 51,794

[22] Filed: Apr. 26, 1993

Related U.S. Application Data

[63] Continuation of Ser. No. 620,567, Dec. 3, 1990, abandoned.

[51] Int. Cl.$^6$ ................... G05G 9/00; F16C 1/10
[52] U.S. Cl. ................ 74/502.2; 74/501.6; 74/502.4; 74/488; 74/489
[58] Field of Search ............ 74/502.4, 502.6, 74/488, 489, 501.6, 502.2; 403/388, 384, 390, 400, 375; 56/10.8, 11.3, 11.7; 411/368, 919, 918, 468

[56] References Cited

U.S. PATENT DOCUMENTS

| | | | |
|---|---|---|---|
| 2,902,882 | 9/1959 | Schwinn | 74/489 |
| 3,524,979 | 8/1970 | Cohen | 74/489 |
| 4,189,954 | 2/1980 | Nakamura et al. | 74/501.6 X |
| 4,619,154 | 10/1986 | Yamanaka | 74/489 |
| 4,627,305 | 12/1986 | Hosokawa | 74/502.2 X |
| 4,667,459 | 5/1987 | Scanland et al. | 74/501.6 |
| 4,684,281 | 8/1987 | Patterson | 74/489 |
| 4,813,214 | 3/1989 | Barnard et al. | 56/10.8 |
| 4,838,113 | 6/1989 | Matsushima et al. | 74/488 |
| 4,930,369 | 6/1990 | Barnard et al. | 50/10.8 |
| 4,936,160 | 6/1990 | Barnard et al. | 74/489 |

FOREIGN PATENT DOCUMENTS 0191140  8/1957  Austria .................. 403/388

Primary Examiner—Carl D. Friedman
Assistant Examiner—Winnie S. Yip

[57] ABSTRACT

A remote control for the throttle, brake and clutch of a lawn mower wherein a single injection molded piece mounts the control levers and terminates the control cables for the various control functions, with such single piece cooperating with the handle bars of the lawn mower to retain the control levers in physical position in respect to such single piece.

18 Claims, 4 Drawing Sheets

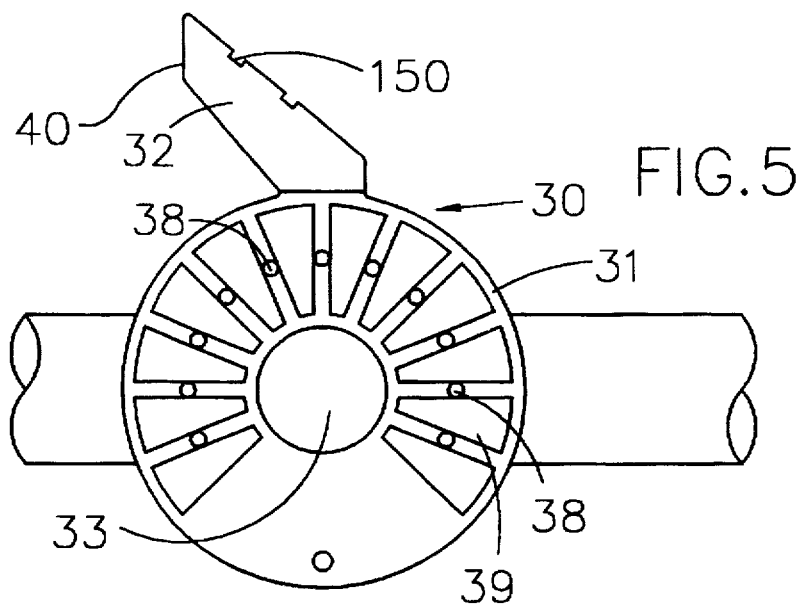
FIG. 5
FIG. 6
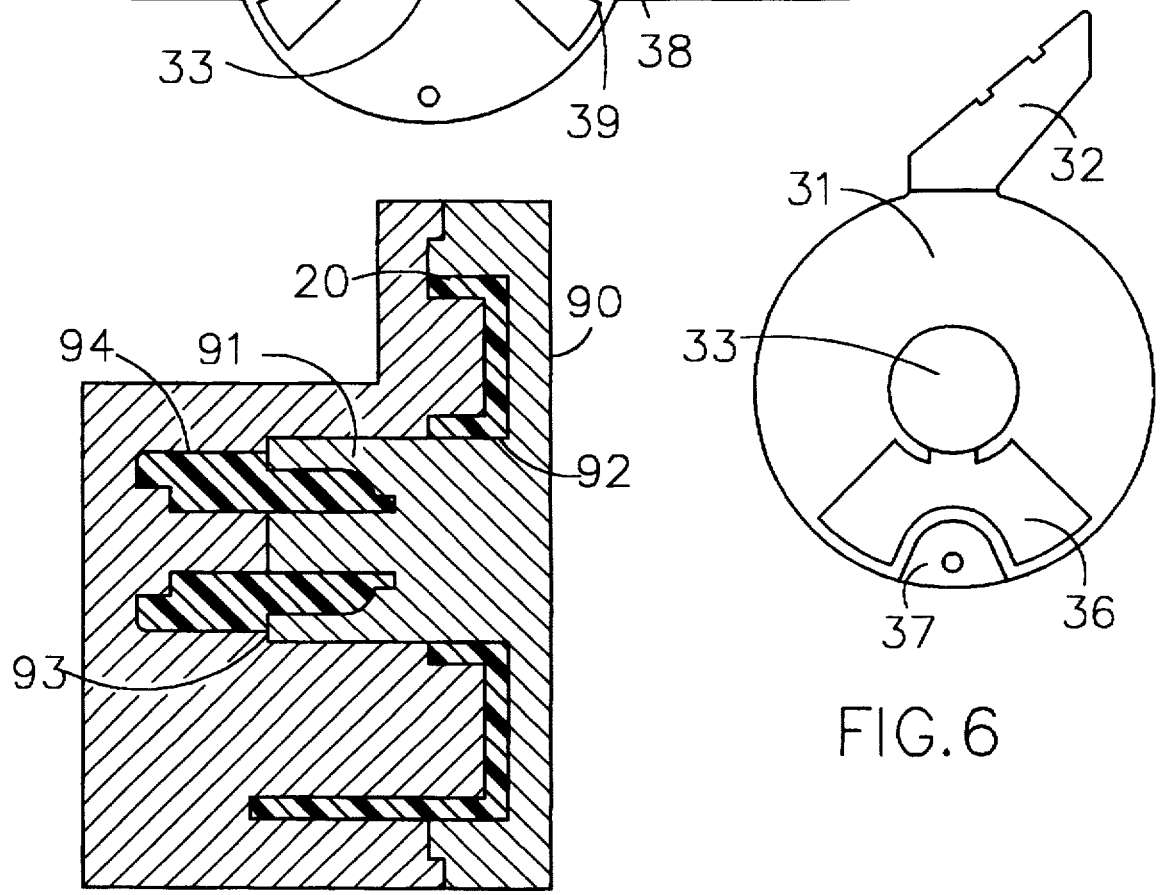
FIG. 7

REMOTE THROTTLE CONTROL

This is a continuation application of U.S. Ser. No. 07/620,567 filed Dec. 3, 1990, now abandoned.

This invention relates to a remote control.

BACKGROUND OF THE INVENTION

Remote controls are utilized in a wide variety of applications to allow for the selective manipulation of operative controls from remote locations. Current remote throttle controls typically consist of three or more separate component groups to provide the functions of securing the boden wire cable, positioning of the throttle lever, and retaining the throttle lever in place. Existing remote throttle controls that bolt directly to handle tubes do very little to utilize the handle tube as a functional component of the throttle. Most throttles instead bolt to the handle with little effort devoted to incorporating the handle into the total design of the throttle. To complete the control function on a typical lawn mower, you must add stops for engine dead man controls and drive controls which are normally located elsewhere on the handlebars. Throttle controls that are commercially available are typically a compromise design that offers provisions for mounting to either side of the handlebar and for use with either positive or negative action engine throttle linkage. There is typically a separate ratchet teeth mechanism for positioning the control lever, and this mechanism is subject to breakage which will result in loss of throttle positioning. These combine to limit the serviceability of a given control. Examples of remote controls include engine throttle controls, clutch controls, air duct positioning controls, chute controls and others. These remote controls are utilized with control cables to transmit longitudinal or rotary movement to the item being controlled. Atypical applications for remote controls include lawn mowers, rototillers, automobiles and bicycles. Other than their characteristic of allowing the selective remote manipulation of operative controls, remote controls are increasingly characterized by their complexity in construction and operation. This complexity includes a multiplicity of parts necessary to inter react to provide the remote control along with the difficulty in assembling and manipulating these controls. This complexity increases the cost, maintenance and sizes of remote controls.

OBJECTS OF THE INVENTION

It is an object of this invention to simplify. the manufacture of parts for remote controls.

It is an object of this invention to simplify the assembly of remote controls.

It is an object of this invention to strengthen remote controls.

It is an object of this invention to increase the service life of remote controls.

It is an object of this invention to reduce the size of remote controls.

Other objects and a more complete understanding may be had by referring to the drawings in which:

DRAWINGS

FIG. 1 is an enlarged side view of a remote control incorporating the invention of the application. This remote control is a combined throttle/clutch brake control;

FIG. 2 is an end on view of the control of FIG. 1 taken generally along the lines indicated;

FIG. 3 is a reverse side view of the control of FIG. 1;

FIG. 4 is a top view of the control of FIG. 1;

FIG. 5 is one side view of the lever of the remote control of FIG. 1;

FIG. 6 is the other side view of the control of FIG. 1;

FIG. 7 is a side view off the mold for the remote control of FIG. 1; and,

FIG. 8 is a top view of a modified control like FIG. 1.

DESCRIPTION OF THE DRAWINGS

This invention relates to an improved remote control. The invention will be described in its preferred embodiment of a remote throttle control incorporating an integral separate control (drive) and non-integral separate control (brake mechanism). The two separate controls utilize unidirectional spring loading into disengaged (drive) and engaged (brake) conditions. The throttle control is not spring loaded. The remote control is used with an engine driven lawn mower. The remote control could be utilized in other applications if desired.

The preferred remote control 10 includes a body 11, a throttle control 30, a drive control 50 and a brake control 70.

Figure 1:
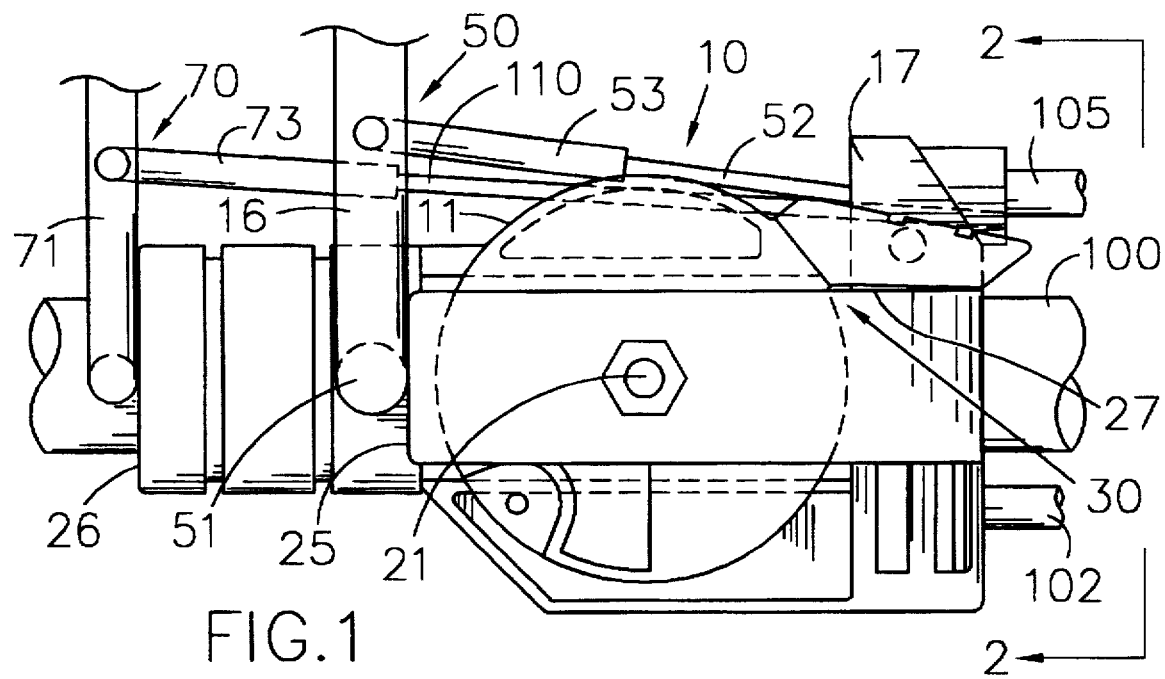
Figure 2:
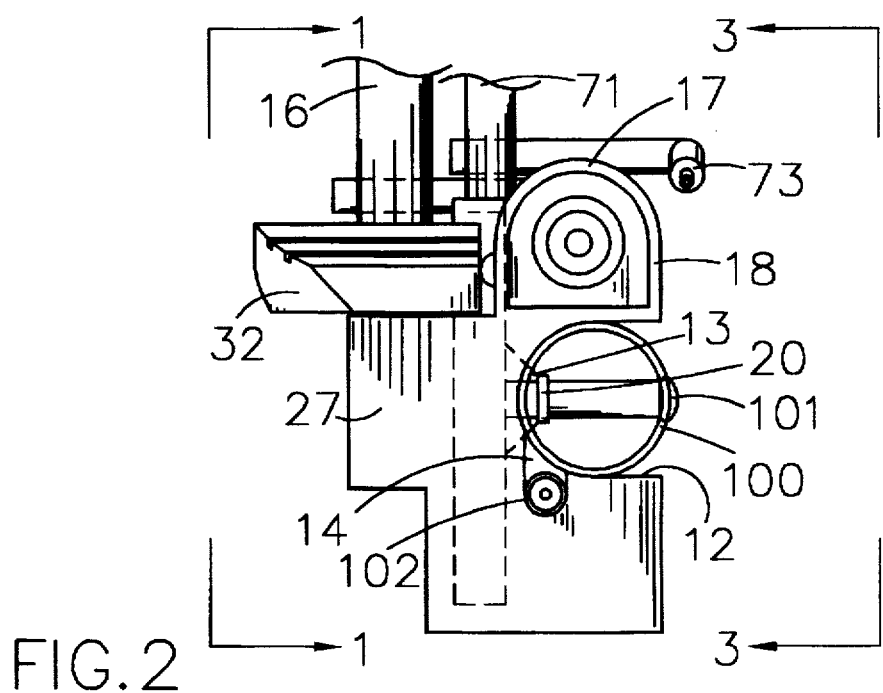
Figure 4:
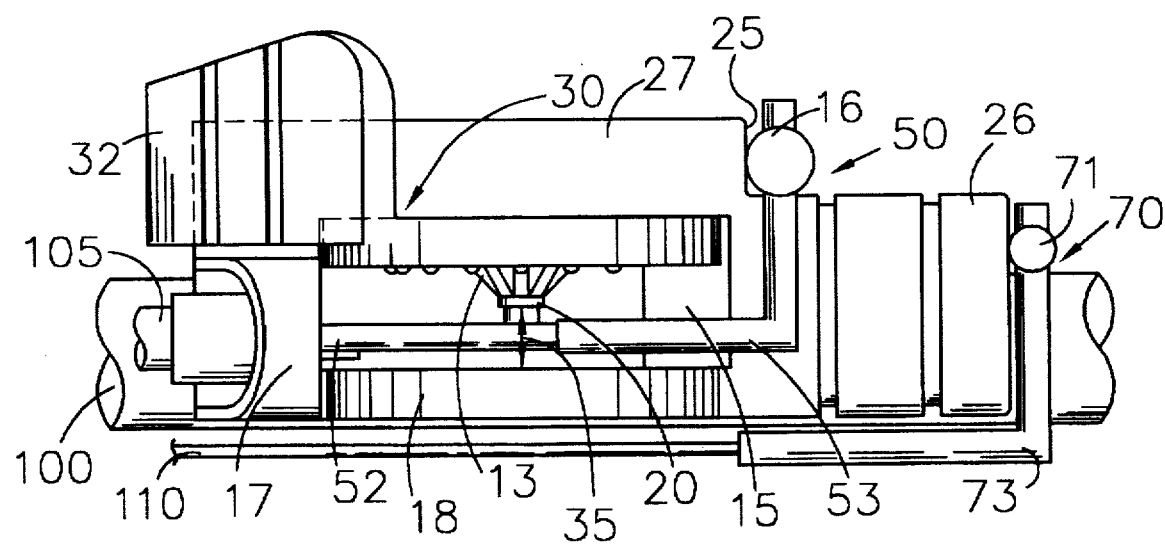
Figure 3:
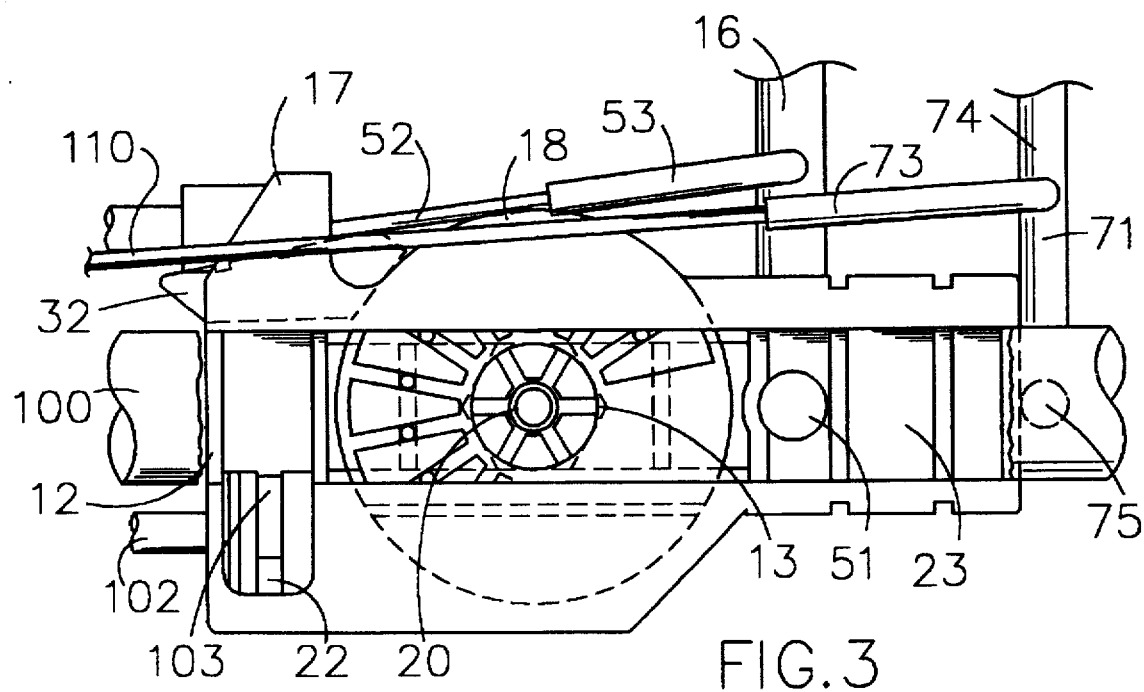

The body 11 is the main part of the remote control 10. The primary purpose of the body 11 is to mechanically interconnect the throttle control 30 and the drive control 50 to the handlebars 100 of the associated lawn mower 101 and to terminate the respective control cables to the proper control 30, 50. The body 11 also provides a stop for the brake control 70.

The preferred body 11 is constructed of a single part including a longitudinal extended mounting opening 12, a throttle control bearing piece 13, a throttle control cable notch 14, a throttle access notch 15, a pivot hole for the drive control rod 16, a drive cable mount 17 and a reinforcing piece 18. The bodes 11 shown is for mounting on the left side of the handlebars 100 on the inside thereof. This provides a physical protection for the control 10 as well as providing an additional protection against abuse in operation. This mounting is therefore preferred.

The particular body 11 disclosed is a single injection molded piece. This piece is molded in a two part die 90 having a single removable punch part entering from the right side of FIG. 1 (to create the drive cable mount 17—FIG. 7). This use of a single molded part for the body 11 is preferred for both the resultant simplicity and strength. Ideally the die has an overlapping shape such that the thickness of the body walls 95 are substantially uniform (with reinforcing ribs if needed). Thus there is a die part 91 that extends through a hole 92 in one side of the body in order to form a wall 93 on the other side (while simultaneously cooperating with the other die part to provide a clearance for the bottom section of the remote control disc 31 later described). Similarly the top 94 of the body 11 is slightly recessed in respect to the remainder of the top. This allows a bypass die to be utilized to create the throttle access notch 15. Due to this design no additional removable die part is necessary for the molding of the body 11. Additional reducing holes 23 reduce the volume of elastic utilized in the body 11 without reducing the strength thereof.

The mounting opening 12 in the body 11 of the throttle control extends longitudinally into the side of the bode 11 for the entire length at approximately midpoint of the height thereof along the longitudinal axis 19 of the body 11. The cross section of this longitudinal mounting opening 12 matches that of the handlebars or other part on which the remote control 10 will be mounted. The cross section shown is substantially semi-circular having a diameter approximately equal to the diameter of the handlebars 100 with which the particular remote control 10 will be utilized.

The throttle control bearing piece 13 is formed in the body 11 from the same side as the longitudinal opening 12 on the inside thereof. The tip 20 of the bearing piece 13 itself extends up to, and preferably slightly into, the longitudinal opening 12. The preferred bearing piece 13 will thus extend slightly up to, and preferably into, a hole in the handlebars 100 after the body 11 is mounted on such handlebars 100. This causes the throttle control 30 to remain on the bearing piece 13 for all operative conditions. in addition this extended tip 20 also serves to further integrate the body 11 with the handlebars 100 by providing an expanded point of contact therebetween while also absorbing the tightening force of the mounting bolt 111. (A hole 21 extends centrally through the throttle control bearing piece 13 so as to hold the body 11 onto the handlebars 100 via the tightening of a bolt 111 therethrough. It is preferred that the throttle control bearing piece 13 have a smooth external surface for sleeve bearing support of the throttle control 30.

The throttle cable notch 14 is formed in the body 11 of the control 10 extending off of the longitudinal opening 12 in such body 11. This notch mounts the control cable to the body 11. It is preferred that this throttle cable notch 14 extend off of such longitudinal opening 12 within the confines of the semicircular cross section. Due to this orientation, after assembly of the throttle or control cable 102 into the throttle cable notch 14 and the orientation of the body 11 on the handlebars 100, the throttle cable 102 will be physically trapped into the throttle cable notch 14. An orienting stop or grommet 103 is located on the throttle cable 102. This part 103 cooperates with a locating notch 22 in the body of the control 10 in order to retain the throttle cable 102 in position in respect to such body 11 against the longitudinal control movement (as later described). Grommets and/or orientation stops 103 are currently used with many throttle control cables. The boden wire 106 of the throttle or control cable 102 terminates in a hole 34 in the throttle control 30 substantially opposite to the lever 32.

The front of the body 11 provides a flat surface 25 that serves as a stop for the drive control lever 16 which is spring loaded into contact by the control cable used therewith. There is a second surface 26 behind the front surface that serves as a stop for the brake lever (again spring loaded by its cable). The radius arc of the reinforcing piece 18 provides a cover for the protruding portion of the throttle control 30 as well as a bridge support for front side of the throttle access notch 15. On the right side of the access notch 15 is a ledge 27 that provides a position for high speed throttle setting when contacted by the throttle lever handle. The longitudinal opening 12 extends beyond the center line of the handlebars to provide a snap fit on the tube and to assure proper distribution of the loads experienced by the throttle control to the tube. Further, the access notch 15 in the top of the body 11 of the control 10 allows operative clearance for the throttle control 30.

The throttle control 30 is constructed of a disc 31 and a handle 32. This control is a rotative control. The disc 31 serves as the interconnection between the handle 32 and the throttle cable 102. The overall diameter of the disc 31 is designed to have a minimum of 1.5 inches of throttle cable travel to assure a complete manipulation of the carburetor speed/choke lever regardless of the losses due to the routing of the cable (which differs from application to application). The particular disc 31 as shown is circular having a central axially extending hole 33. in the particular embodiment disclosed the disc 31 has a depth slightly greater than the distance 35 between the end 20 or the throttle control 30 bearing piece 13 and the reinforcing piece 18 on the opposite side of the access notch 15. For this reason the throttle control 30 could not easily be inserted through the access notch 15 and assembled around the throttle control bearing piece 13 absent some additional feature. To allow for such assembly a clearance 36 is formed in the side of the disc 31 adjacent to the hole 33. The width of this clearance 36 is such that when fitted over the end 20 of the throttle control bearing piece 13, the effective depth of the disc 31 is sufficiently reduced such that the throttle control 30 can be assembled onto the bearing piece 13 of the body 11 with the hole 33 of such throttle control extending over such bearing piece 13. An additional depth reduction mount 37 and hole 34 is formed in the side of the disc 31 neighboring the clearance 36 in order to allow for termination of the end of the throttle cable 102 boden wire 106 in a conventional manner.

There are protrusions 38 formed on the other side of the throttle control 30. These protrusions 38 extend somewhat from the surface of the disc 31 (0.030 preferred). The protrusions 38 inter react with the surface of the handlebars 100 so as to prevent the inadvertent movement of the throttle control 30. Note that due to the curvature of the surface of the handlebars 100, there is no solid change in the operative force manipulating the control 30. Instead the force is constantly changing. This lengthens the life of the control 30 as well as providing a more luxurious operator feedback. In the particular embodiment disclosed there are eleven protrusions 38 which inter react with the handlebars 100 in throttle control 30 Other differing positions could be provided by altering the spacing and dimensions of the protrusions 38. A pocket 39 between the protrusions 38 reduces the amount of plastic necessary to form the throttle control 30. In this respect one should note that the pockets 39 in combination with the clearance 36 and mount 37 effectively reduce the width of the disc substantially over the entire surface thereof. Thus the disc 31 is formed of a small amount of plastic irrespective of its substantial depth. As this depth provides for a bearing surface for the throttle control, this is advantageous. Note that the preferred 0.030 projection could be from 0.015 to 0.060 depending on the stack up tolerances of the design and the amount of pressure desired to retain each position. These projections were placed on a 0.75 radius in the preferred embodiment shown. It is further preferred to place them any where from a 0.405 radius to a 1.01 radius depending on the desired force required to move the throttle lever to each position. There is a functional relationship between the height of the projection, the radius of its position, and the force required to operate the lever to each position setting. For example, the force required to move a lever with a 0.060 projection positioned on a 0.405 radius would be about equal to a lever with a 0.015 projection on a 1.01 radius. However, in final production the unit with the 0.060 projection offers a more consistent resistance than the unit with a 0.015 projection. The throttle cable wire mount 37 was located on a 1.0 inch radius to accomplish the 1.5 inch throw minimum, (1.6 inch actual). The 0.250 radius wall formed around the wire mount 37 is a barrier to minimize the possibility of the throttle cable wire interfering with the throttle travel. The handle portion of the throttle has been cored and ribs are spaced so that they will receive a protrusion on the throttle body for the purpose of locking the throttle lever into the full choke position. Further, the handle portion of the throttle lever has a leading surface 40 to ease operating control when the throttle lever is placed into its full forward position. This is to assist in locating and grasping the handle to ease the removal from the choke position lock. Note that appearance was the only reason for the throttle lever disc 31 to be round, it could have been any of a number of different shapes. Two grooves 150 were added to the top surface of the throttle lever handle to minimize the sink marks predicted during processing of the part.

The handle 32 for the control 30 is the main operator manipulative part for the throttle control 30. In the particular embodiment disclosed the throttle control handle 32 extends substantially tangentially off of the disc 31. This allows the handle 32 to lie along side the too of the body 11 of the control 10 when such handle is in its forward down position. The body 11 of the control 10 at the ends of the access notch 15 cooperate with the handle 32 to provide for positive physical stops at the two control extremes. The shape and positioning of the handle 32 utilized in other embodiments would depend upon the particular design involved.

Note that the throttle control 30 disclosed is designed to be utilized with engines having a carburetor linkage requiring a negative action from the remote throttle control. This is preferred as most engines have such negative action (positive action engines normally have a separate throttle control on the engine).

The remote control 10 includes a second integral control. The second integral control of the preferred embodiment shown is a drive control for the wheel drive clutch of the lawn mower. In other circumstances this second integral control might be omitted (throttle control only) or altered to another purpose (such as blade brake or clutch/brake).

The drive control 50 shown includes a rod 16 and a control cable 105. The rod 16 has two ends 52 and a handle 73. The particular rod 16 disclosed is formed of bent wire substantially ⅛" in diameter. A pivot hole 51 is within the body 11 of the control 10. This pivot hole 51 provides a mounting position for an end of drive control rod 16. (The other end is directly pivoted to the opposite handle bars.) The pivot hole 51 is preferably physically displaced from the hole 21 in the bearing piece 13 so as to partially disassociate this clutch/brake control 50 from the throttle control 30. There is a corresponding hole in the handlebars 100 substantially in line with the pivot hole 51 so as to provide for a further support of the drive control 50.

The drive cable mount 17 for the drive mechanism is formed integrally to the body 11 of the control 10 extending off of the top surface thereof. This cable mount 17 serves to connect the drive control cable 105 to the body 11 of the control 10. It is preferred this control cable 105 utilizes a snap in fit with the cable mount 17. This insures an accurate correlation between the positioning of the drive control rod 16 and the boden wire 52 of the control cable 105. Alternately the spring loading of the control cable(s) can be utilized.

The boden wire 52 of the control cable 105 is interconnected to the drive control rod 16 via an "L" shaped zinc fitting 53 cast onto the free end thereof. This fitting 53 allows one to utilize a straight control rod 16 laterally displaced from the drive cable mount 17.

The body 11 of the control 10 is designed such that there is no interfering parts between the cable mount 17 and the rest of the drive mechanism 50. Part of this is provided through the displacement of the throttle control 30 to one side of the center of the cable mount 17. Additional clearance is created by displacing the reinforcing piece 18 of the top of the body of the control 11 to the other side of the center of the cable mount 17. Note that although this reinforcing piece 18 is shown having an upper curvature substantially matching that of the throttle control 30, this shape is dictated primarily by design preference and not utility.

The brake control 70 shown includes a rod 71 and a control cable 110. This rod 71 has two ends 72 and a handle 73. The particular rod 71 disclosed is formed of bent wire substantially ⅛" in diameter.

The ends 72 of the rod 71 are inserted into holes in the handlebars 100 for rotary motion in respect thereto. On the side of the handlebars with the control 10, the hole 75 for the end 72 of the rod 71 is located immediately adjacent to the body 11 of the remote control 10. This allows the body 11 of the control 10 to serve as a stop for the brake rod 71. It also aids in localizing the control 10 as well as further integrating it with the handlebars 100.

The handle 74 of the rod 71 extends between the two ends 72 thereof so as to provide an operative manipulative control for the brake mechanism 70. The interconnection between the rod 71 and the control cable 105 occurs through an "L" shaped zinc fitting 73. As in the drive mechanism 50, this fitting 73 is molded onto the end of the brake cable boden wire 110. This fitting 73 spaces the brake cable 110 from the remainder of the control 10. The brake cable 110 is terminated to the handlebars 100 in a conventional manner spaced from the control 10 such that the rotary motion of the rod 71 is transformed into longitudinal motion of the main boden wire of the brake cable 110. Again since the particular brake cable 110 shown has a heavy actuated spring bias, no separate spring or mechanical connection is necessary for the rod 71 at this end of the control cable 110.

Figure 8:
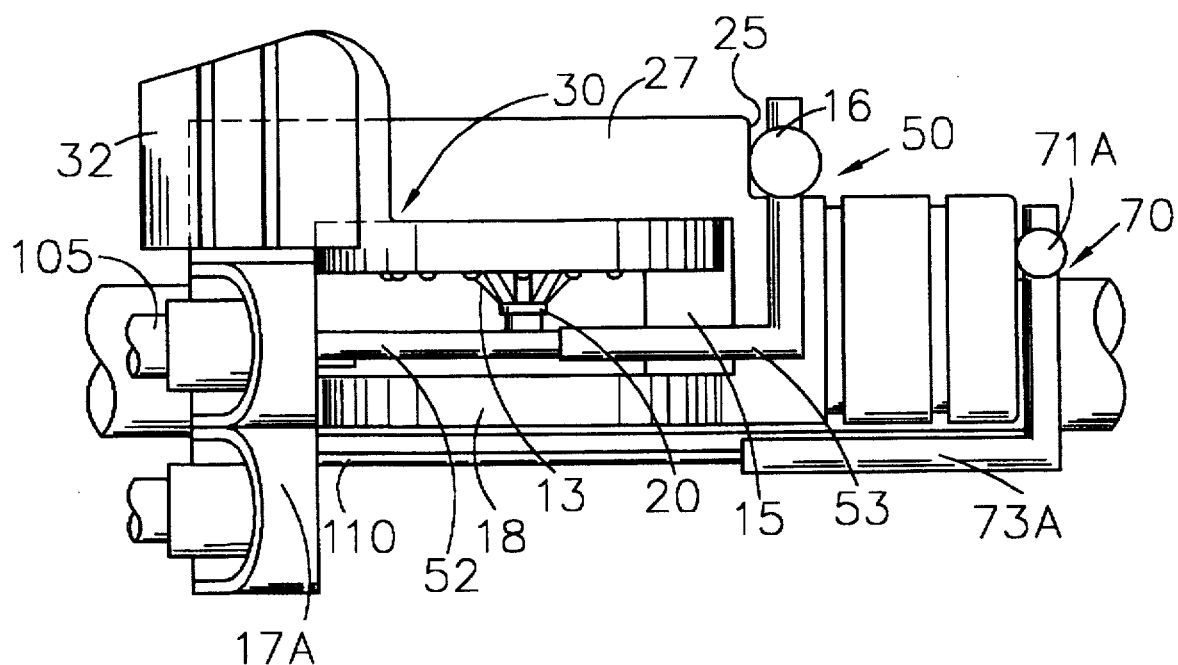

The brake control 70 shown has a pivot point direct to the handlebars. This is preferred because the majority of remote controls 10 utilize but one control separate from the throttle (normally a blade brake or clutch). The second control, the brake control 70, thus can be omitted without effecting the appearance of the remote control 10 (i.e., there are no obvious missing parts). If desired the body 11 could be extended past the brake control pivot point and an additional cable mount incorporated into the body 11 so as to fully integrate the second non-throttle control into the remote control 10. This is shown in FIG. 8 with the modified parts having the suffix "A".

With the invention of this application, three control functions could be satisfied with no more than four components (body 11, disc 31, rod 16 and rod 71) in addition to the various control cables. In addition the handlebar tube is used for securing the throttle lever, the throttle cable, and the drive control cable to the remote control. By captivating the throttle lever disc 31 between the body 11 and the handlebar tube 100, the handlebar tube 100 could effectively replace the other half of the body 11. With this configuration, the design of the body 11 could integrate the handlebar tube 100 more effectively into the aesthetic of the remote control unit 10. The handlebar tube 100 is also used to position the throttle lever due to the projections on the throttle lever being in close proximity to the handlebar tube. Further the radius of the handle bar tube would provide passive resistance to the movement of the throttle lever as it approached each position.

In use the operator stands in position in respect to the lawn mower and manipulates first the brake rod 71 to its operative position (downward along the handlebars 100 in the embodiment disclosed). At this time the operator starts the engine of the lawn mower. The starting of the lawn mower and/or the engine speed is adjusted by the selective manipulation of the handle 32 of the throttle control 30. The protrusions 38 acting against the sides of the handlebars 100 serve to locate the throttle control in the preset position as well as retaining the throttle control in such positions against accidental movement. The forward drive of the lawn mower is provided by moving the drive control rod 16 downwards alongside the brake control rod 71. Upon release of the drive rod 16, the lawn mower stops in a conventional manner. Upon release of the brake rod 71 either the blade alone or the engine and blade stops depending on the particular type of disengagement mechanism being utilized with the cable 110. The operator then can manipulate the rods 71 and 16 to re-engage the lawn mower again.

Although the invention has been described in its preferred form with a certain degree of particularity, it is to be understood that numerous changes can be made. For example inverse action for the controls can be provided by relocating the respective cable termination and connections to opposite sides of the control pivot points (so as to provide a positive action throttle control for example) The number of controls, the locations of the controls, the cable terminations, etc. can likewise be changed without deviating from the invention as hereinafter claimed.

What is claimed:

1. A remote control device having a handlebar tube and a control cable with a wire, the control comprising a body having a side, said side of said body having a mounting opening therein, a bearing piece, said bearing piece having a tip, said bearing piece being fixed to said body next to said mounting opening with said tip extending towards said mounting opening, means to mount the control cable to said body, a rotatable control, said rotatable control having a hole and a lever and a control cable wire termination, said rotatable control being rotatively mounted to said bearing piece by said hole, means to terminate the wire of the control cable to said control cable wire termination, means to mount the handlebar tube in said mounting opening, and means to interconnect said body to the handlebar tube, the handlebar tube having a surface and said rotatable control having a side, protrusions, said protrusions extending off of said side of said rotatable control, and said side of said rotatable control being adjacent to said surface of said handlebar tube once mounted with said protrusions engaging said surface of said handlebar tube so as to retain said rotatable control in a selectable position in respect to such tube.

2. The remote control device of claim 1 wherein said body has a longitudinal axis and said mounting opening extends into said side of said body along the longitudinal axis.

3. The remote control device of claim 1 characterized in that said body has an inside with said mounting opening extending thereinto, and said bearing piece being inside of said body and adjacent to said mounting opening.

4. The remote control device of claim 3 characterized in that said handlebar tube retains said rotatable control on said bearing piece.

5. The remote control device of claim 1 characterized by the addition of a cable notch in said body, said cable notch extending off of said mounting opening, and said cable notch being adapted for mounting the control cable to said body.

6. The remote control device of claim 5 characterized in that said handlebar tube in said mounting opening retains said control cable in said cable notch.

7. The remote control device of claim 1 characterized in that said bearing piece has an end and a hole, said end of said bearing piece being adjacent to said handlebar once mounted in contact therewith, a bolt, and said bolt extending through said hole in said bearing piece and a hole in said handlebar tube to interconnect said body to said handlebar tube.

8. A remote control device having a handlebar tube, a throttle control cable with a wire and a secondary control cable having a wire, the control comprising a body having a side extending longitudinally thereof, said side of said body having a mounting opening therein, a bearing piece, said bearing piece having a tip, said bearing piece being fixed to said body next to said mounting opening with said tip extending towards said mounting opening, means to mount said throttle control cable to said body next to said mounting opening, a rotatable throttle control, said rotatable throttle control having a hole and a lever and a control cable wire termination, said rotatable throttle control being rotatably mounted to said bearing piece by said hole, means to terminate the wire of said throttle control cable to said control cable wire termination, means to mount the handlebar tube in said mounting opening with said tip extending at least up to said mounting opening, means to interconnect said body to the handlebar tube, a pivot hole, said pivot hole being in said body, a control rod, said control rod being in said pivot hole in said body, means to mount the secondary control cable to said body, and said wire of said secondary control cable being interconnectable to said control rod, a cable notch in said body, said cable notch extending off of said mounting opening, and said cable notch being adapted for mounting the control cable to said body.

9. The remote control device of claim 8 characterized in that said body has an inside with said mounting opening extending thereinto, and said bearing piece being inside of said body and adjacent to said mounting opening.

10. The remote control device of claim 8 characterized in that said handlebar tube once mounted in said mounting opening retains said control cable in said cable notch.

11. The remote control device of claim 8 characterized in that said bearing piece has an end and a hole, said end of said bearing piece being adjacent to said handlebar tube once mounted in contact therewith, a bolt, and said bolt extending through said hole in said bearing piece and a hole in said handlebar tube to interconnect said to said handlebar tube.

12. A remote control device having a handlebar tube, a throttle control cable with a wire and a secondary control cable having a wire, the control comprising a body having a side extending longitudinally thereof, said side of said body having a mounting opening therein, a bearing piece, said bearing piece having a tip, said bearing piece being fixed to said body next to said mounting opening with said tip extending towards said mounting opening, means to mount said throttle control cable to said body next to said mounting opening, a rotatable throttle control, said rotatable throttle control having a hole and a lever and a control cable wire termination, said rotatable throttle control being rotatably mounted to said bearing piece by said hole, means to terminate said wire of said throttle control cable to said control cable wire termination, means to mount said handlebar tube in said mounting opening with said tip extending at least up to said mounting opening,
means to interconnect said body to said handlebar tube, a pivot hole, said pivot hole being in said body, a control rod, said control rod being in said pivot hole in said body, means to mount said secondary control cable to said body, said wire of said secondary control cable being interconnectable to said control rod, said handlebar tube having a surface and said rotatable control having a side, protrusions, said protrusions extending off of said side of said rotatable control, and said side of said rotatable control being adjacent to said surface of said handlebar tube once mounted with said protrusions engaging said surface of said tube so as to retain said rotatable control in a selectable position in respect to such tube.

13. A remote control device having a handlebar tube, a throttle control cable with a wire, and a secondary control cable with a wire, the control comprising a body, said body having a longitudinal axis and a side, said side of said body having a mounting opening therein, said mounting opening extending longitudinally of said body, said mounting opening opening into the side of said body, a bearing piece, said bearing piece having a tip, said bearing piece being fixed to said body on the inside thereof next to said mounting opening with said tip extending towards said mounting opening, a cable notch in said body, said cable notch extending off of said mounting opening, said cable notch being adapted for mounting said throttle control cable to said body, a rotatable throttle control, said rotatable throttle control having a hole and a lever and a control cable wire termination, said rotatable throttle control being rotatably mountable to said bearing piece by said hole, means to terminate said wire of said throttle control cable to said throttle control cable wire termination, means to mount said handlebar tube in said mounting opening, said handlebar tube once mounted in said mounting opening retaining said throttle control cable in said cable notch, means to interconnect said body to said handlebar tube, a pivot hole, said pivot hole being in said body, said pivot hole extending through said body into a hole in said handlebar tube, a control rod, said control rod having an end, said end of said control rod being in said pivot hole in said body for rotatable motion in respect thereto, a cable mount, said cable mount being in said body, said secondary control cable being mountable to said body with said cable mount, and said wire of said secondary control cable being interconnectable to said control rod.

14. The remote control device of claim 13 characterized in that said rotatable control has a side, protrusions, said protrusions extending off of said side of said rotatable control, and said side of said rotatable control being adjacent to said handlebar tube once mounted with said protrusions engaging such tube so as to retain said rotatable control in a selectable position in respect to such tube.

15. The remote control device of claim 13 characterized in that said bearing piece has an end and a hole, said end of said bearing piece being adjacent to said handlebar tube once mounted in contact therewith, a bolt, and said bolt extending through said hole in said bearing piece and a hole in said handlebar tube to interconnect said body to said handlebar tube.

16. A position stop in combination with a device having a rotatable control with a mounting opening and a handlebar tube, said position stop located inside of said rotatable control, said position stop comprising a body having at least two protrusions, said protrusions extending off a side of the mounting opening of the rotatable control, the side of the mounting opening of the rotatable control being immediately adjacent to the handlebar tube, and said protrusions selectively directly engaging the tube so as to retain the rotatable control in differing selected positions in respect to such tube.

17. A device comprising a body, a control cable, and a handlebar tube, a handlebar mounting opening being in the body, said device having means to connect said body by said handlebar mounting opening to the handlebar, a control cable notch, said control cable notch having an opening side opened on said handlebar mounting opening, said control cable notch extending off of said handlebar mounting opening, and means for the body to mount the control cable in said control cable notch which is confined therein by the handlebar tube.

18. A device comprising a body, a control cable, and a handlebar tube, a handlebar mounting opening being in the body, said device having means to connect said body by said handlebar mounting opening to the handlebar, a control cable notch, said control cable notch having an open side opened on said handlebar mounting opening, said control cable notch extending off of said mounting opening, means for the body to mount the control cable in said control cable notch which is confined therein by the handlebar tube, the handlebar tube having an outer diameter wall and characterized in that the handlebar tube is located in said mounting opening, and the wall of the handlebar tube retains the control cable in said control cable notch.

* * * * *